US012020597B2

(12) United States Patent
McDaniel

(10) Patent No.: US 12,020,597 B2
(45) Date of Patent: Jun. 25, 2024

(54) LINERLESS COMBINED MAILING LABEL AND RETURN LABEL AND METHOD OF MANUFACTURING SAME

(71) Applicant: Iconex LLC, Duluth, GA (US)

(72) Inventor: Robert McDaniel, Rogersville, TN (US)

(73) Assignee: Iconex LLC, Duluth, GA (US)

( * ) Notice: Subject to any disclaimer, the term of this patent is extended or adjusted under 35 U.S.C. 154(b) by 157 days.

(21) Appl. No.: 17/679,399

(22) Filed: Feb. 24, 2022

(65) Prior Publication Data

US 2022/0246065 A1 Aug. 4, 2022

Related U.S. Application Data

(63) Continuation of application No. 17/114,056, filed on Dec. 7, 2020, now Pat. No. 11,348,483, which is a (Continued)

(51) Int. Cl.
*G09F 3/02* (2006.01)
*G09F 3/10* (2006.01)

(52) U.S. Cl.
CPC .............. *G09F 3/0288* (2013.01); *G09F 3/10* (2013.01); *G09F 2003/0213* (2013.01);

(Continued)

(58) Field of Classification Search
CPC .. G09F 3/0288; G09F 3/10; G09F 2003/0213; G09F 2003/022;

(Continued)

(56) References Cited

U.S. PATENT DOCUMENTS 3,312,005 A 4/1967 Mcelroy
5,752,722 A 5/1998 Moore et al.

(Continued)

FOREIGN PATENT DOCUMENTS

CN 103456237 B 12/2016
CN 2013102107448.X 12/2016

(Continued)

OTHER PUBLICATIONS

"U.S. Appl. No. 13/485,402, Advisory Action dated May 29, 2015", 3 pgs.

(Continued)

*Primary Examiner* — Justin V Lewis
(74) *Attorney, Agent, or Firm* — Schwegman Lundberg & Woessner, P.A.

(57) ABSTRACT

A combined primary label and secondary label comprises a first piece of paper, a first release coating disposed on a portion of the first piece of paper, a second piece of paper, a second release coating different from the first release coating and disposed on a portion of the second piece of paper. The combined primary and secondary label further comprises an adhesive layer disposed between the first and second pieces of paper such that (i) a primary label can be peeled away with at least some adhesive of the adhesive layer from the second release coating disposed on the portion of the second piece of paper, and (ii) a secondary label can be peeled away with at least some adhesive of the same adhesive layer from the first release coating disposed on the portion of the first piece of paper.

14 Claims, 4 Drawing Sheets

Related U.S. Application Data continuation of application No. 16/741,380, filed on Jan. 13, 2020, now Pat. No. 10,923,001, which is a continuation of application No. 16/163,242, filed on Oct. 17, 2018, now Pat. No. 10,559,230, which is a continuation of application No. 13/485,402, filed on May 31, 2012, now Pat. No. 10,127,842.

(52) U.S. Cl.
CPC .. *G09F 2003/022* (2013.01); *G09F 2003/026* (2013.01); *G09F 2003/0267* (2013.01); *G09F 2003/0269* (2013.01)

(58) Field of Classification Search
CPC ....... G09F 2003/026; G09F 2003/0267; G09F 2003/0269; G09F 3/02
USPC .... 40/299.01, 594, 630, 638, 661.09; 281/5; 283/72, 74, 81, 86, 94, 98, 100, 101, 104, 283/105
See application file for complete search history.

(56) References Cited

U.S. PATENT DOCUMENTS

| | | | | |
|---|---|---|---|---|
| 10,127,842 | B2 | 11/2018 | McDaniel | |
| 2002/0193225 | A1 | 12/2002 | Raming | |
| 2004/0188009 | A1 | 9/2004 | Mckillip | |
| 2010/0012276 | A1 | 1/2010 | Kobayashi | |
| 2012/0234481 | A1* | 9/2012 | Raming | G09F 3/0288 283/105 |
| 2013/0320661 | A1 | 12/2013 | McDaniel | |
| 2019/0122588 | A1 | 4/2019 | Mcdaniel | |
| 2020/0160757 | A1 | 5/2020 | Mcdaniel | |
| 2021/0090467 | A1 | 3/2021 | Mcdaniel | |

FOREIGN PATENT DOCUMENTS

| | | | |
|---|---|---|---|
| EP | 1229509 | A2 | 8/2002 |
| JP | 2000019972 | A | 1/2000 |
| JP | 2006181991 | A | 7/2006 |
| JP | 6275394 | B2 | 1/2018 |

OTHER PUBLICATIONS

"U.S. Appl. No. 13/485,402, Advisory Action dated Jun. 30, 2016", 3 pgs.
"U.S. Appl. No. 13/485,402, Advisory Action dated Oct. 4, 2017", 3 pgs.
"U.S. Appl. No. 13/485,402, Final Office Action dated Mar. 19, 2015", 12 pgs.
"U.S. Appl. No. 13/485,402, Final Office Action dated Apr. 20, 2016", 14 pgs.
"U.S. Appl. No. 13/485,402, Final Office Action dated Jul. 13, 2017", 14 pgs.
"U.S. Appl. No. 13/485,402, Non Final Office Action dated Jan. 3, 2017", 13 pgs.
"U.S. Appl. No. 13/485,402, Non Final Office Action dated Aug. 21, 2014", 16 pgs.
"U.S. Appl. No. 13/485,402, Non Final Office Action dated Sep. 29, 2015", 13 pgs.
"U.S. Appl. No. 13/485,402, Non Final Office Action dated Dec. 6, 2013", 15 pgs.
"U.S. Appl. No. 13/485,402, Non Final Office Action dated Dec. 28, 2017", 13 pgs.
"U.S. Appl. No. 13/485,402, Notice of Allowance dated Jul. 16, 2018", 9 pgs.
"U.S. Appl. No. 13/485,402, Response filed Mar. 19, 2014 to Non Final Office Action dated Dec. 6, 2013", 12 pgs.
"U.S. Appl. No. 13/485,402, Response filed Mar. 28, 2018 to Non Final Office Action dated Dec. 28, 2017", 9 pgs.
"U.S. Appl. No. 13/485,402, Response filed Apr. 3, 2017 to Non Final Office Action dated Jan. 3, 2017", 8 pgs.
"U.S. Appl. No. 13/485,402, Response filed May 19, 2015 to Final Office Action dated Mar. 19, 2015", 8 pgs.
"U.S. Appl. No. 13/485,402, Response filed Jun. 20, 2016 to Final Offifce Action dated Apr. 20, 2016", 8 pgs.
"U.S. Appl. No. 13/485,402, Response filed Sep. 18, 2017 to Final Office Action dated Jul. 13, 2017", 8 pgs.
"U.S. Appl. No. 13/485,402, Response filed Nov. 21, 2014 to Non Final Office Action dated Aug. 21, 2014", 7 pgs.
"U.S. Appl. No. 13/485,402, Response filed Dec. 22, 2015 to Non Final Office Action dated Sep. 29, 2015", 7 pgs.
"U.S. Appl. No. 16/163,242, Non Final Office Action dated Jun. 14, 2019", 8 pgs.
"U.S. Appl. No. 16/163,242, Notice of Allowance dated Oct. 7, 2019", 8 pgs.
"U.S. Appl. No. 16/163,242, Response filed Sep. 16, 2019 to Non-Final Office Action dated Jun. 14, 2019", 8 pgs.
"U.S. Appl. No. 16/163,242, Supplemental Preliminary Amendment filed Jan. 15, 2019", 7 pgs.
"U.S. Appl. No. 16/741,380 Supplemental Preliminary Amendment filled Feb. 12, 2020", 8 pgs.
"U.S. Appl. No. 16/741,380, Non Final Office Action dated Aug. 6, 2020", 13 pgs.
"U.S. Appl. No. 16/741,380, Notice of Allowance dated Oct. 16, 2020".
"U.S. Appl. No. 16/741,380, Response filed Oct. 7, 2020 to Non Final Office Action dated Aug. 6, 2020", 6 pgs.
"U.S. Appl. No. 17/114,056, Non Final Office Action dated Sep. 14, 2021", 11 pgs.
"U.S. Appl. No. 17/114,056, Notice of Allowance dated Feb. 4, 2022", 7 pgs.
"U.S. Appl. No. 17/114,056, Response filed Dec. 14, 2021 to Non Final Office Action dated Sep. 14, 2021", 7 pgs.
"European Application Serial No. 13164798.4, Communication Pursuant to Article 94(3) EPC dated Nov. 28, 2018", 5 pgs.
"European Application Serial No. 13164798.4, Extended European Search Report dated Feb. 21, 2014", 8 pgs.
"European Application Serial No. 13164798.4, Invitation pursuant to Rule 137(4) EPC and Article 94(3) EPC dated Apr. 5, 2017", 3 pgs.
"European Application Serial No. 13164798.4, Response filed Feb. 6, 2019 to Communication Pursuant to Article 94(3) EPC dated Nov. 28, 2018", 22 pgs.
"European Application Serial No. 13164798.4, Response filed May 22, 2014 to Extended European Search Report dated Feb. 21, 2014", 9 pgs.
"Japanese Application Serial No. 2013-090711, Office Action dated Apr. 14, 2017", (w/ English Translation), 21 pgs.
"Japanese Application Serial No. 2013-090711, Response filed Jul. 13, 2017 to Office Action dated Apr. 14, 2017", (w/ English Translation of Amended Claims), 8 pgs.

* cited by examiner

LINERLESS COMBINED MAILING LABEL AND RETURN LABEL AND METHOD OF MANUFACTURING SAME

CROSS-REFERENCE TO RELATED APPLICATIONS

This application is a continuation of U.S. patent application Ser. No. 17/114,056, filed Dec. 7, 2020, which is a continuation of U.S. patent application Ser. No. 16/741,380, filed Jan. 13, 2020, which is a continuation of U.S. patent application Ser. No. 16/163,242, filed Oct. 17, 2018, which is a continuation of U.S. patent application Ser. No. 13/485,402, filed May 31, 2012, which applications are incorporated by reference herein in their entirety.

BACKGROUND

The present application relates to mailing labels and return labels, and is particularly directed to a linerless combined mailing label and return label and method of manufacturing same.

A known combined mailing label and return label includes two pieces of thermal paper in which one piece is used as a mailing label and the other piece is used as a return label. A release liner is provided between pressure-sensitive glue which is disposed on the backside of the mailing label and pressure-sensitive glue disposed on the backside of the return label. The release liner allows mailing label along with its pressure-sensitive glue to be cleanly peeled away from one side of the release liner, and return label along with its pressure-sensitive glue to be cleanly peeled away from the other side of the release liner. It would be desirable to provide a combined mailing label and return label which is less expensive and which is easier to manufacture.

SUMMARY

In accordance with one embodiment, a combined primary label and secondary label comprises a first piece of paper, a first release coating disposed on a portion of the first piece of paper, a second piece of paper, a second release coating different from the first release coating and disposed on a portion of the second piece of paper. The combined primary and secondary label further comprises an adhesive layer disposed between the first and second pieces of paper such that (i) a primary label can be peeled away with at least some adhesive of the adhesive layer from the second release coating disposed on the portion of the second piece of paper, and (ii) a secondary label can be peeled away with at least some adhesive of the same adhesive layer from the first release coating disposed on the portion of the first piece of paper.

DETAILED DESCRIPTION

Figure 1:
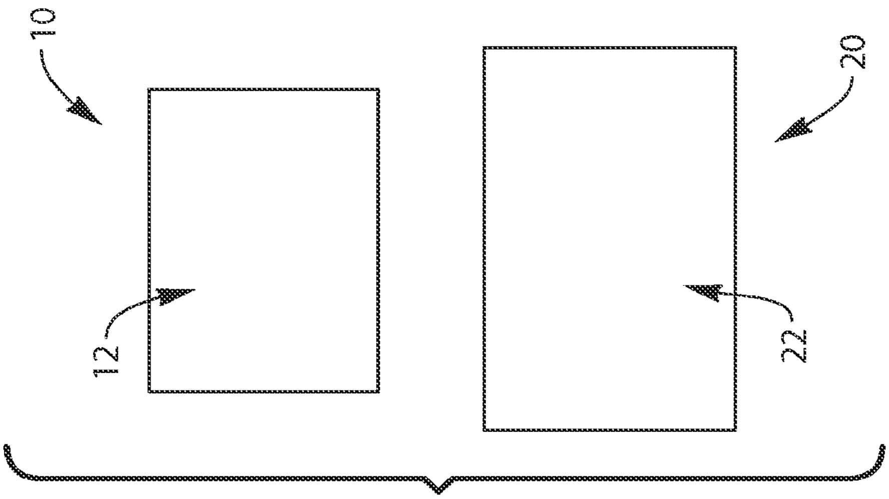
FIG. 1 shows backside views of first and second thermal paper portions used in the construction of a linerless combined mailing label and return label in accordance with one embodiment.

Referring to FIG. 1, a first piece 10 of material and a second piece 20 of material are provided to form a combined mailing label and return label in accordance with one embodiment as will be described herein. The first piece 10 of material has a front major surface 11 (shown in FIG. 5) and a back major surface 12. The front major surface 11 of the first piece 10 of material has a thermal-sensitive coating disposed thereon. Similarly, the second piece 20 of material has a front major surface 13 (shown in FIG. 5) and a back major surface 22. The front major surface 13 of the second piece 20 of material has a thermal-sensitive coating (also not shown) disposed thereon. Size of the second piece 20 of material is larger than size of the first piece 10 of material such as shown in FIG. 1.

Figure 2:
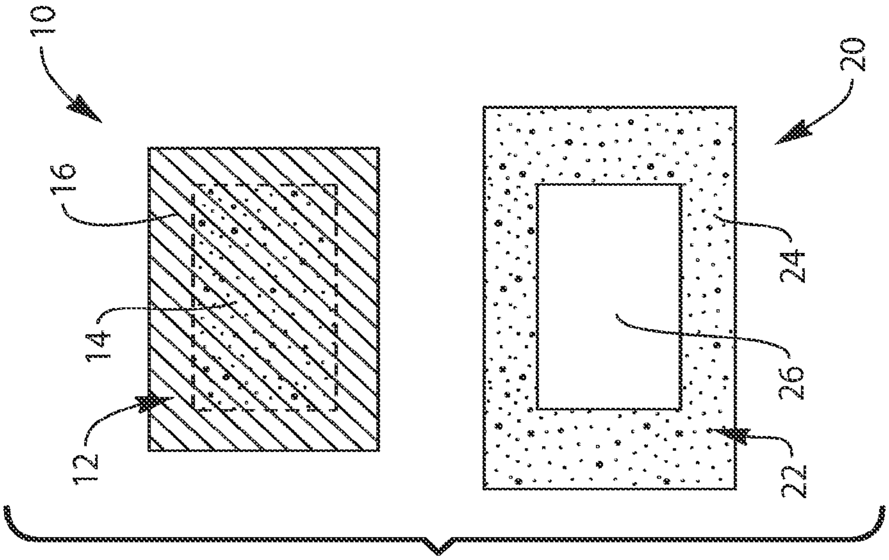
FIG. 2 is similar to FIG. 1, and shows a release coating and a pressure-sensitive glue disposed on the first thermal paper portion of FIG. 1, and a release coating disposed on the second thermal paper portion of FIG. 1.

As shown in FIG. 2, a first release coating 14 is disposed on a substantially rectangular-shaped central portion of the backside 12 of the first piece 10 of material. A layer adhesive in the form of pressure-sensitive glue 16 covers the first release coating 14 and is disposed on substantially the entire backside 12. Also, as shown in FIG. 2, a second release coating 24 is disposed on a substantially frame-shaped area of the backside 22 of the second piece 20 of material. The second release coating 24 and the first release coating 14 may be the same or different from each other. The frame-shaped second release coating 24 forms a central rectangular area 26 which is devoid of second release coating 24. The size of rectangular area 26 on the back side 22 of the second piece 20 of material substantially corresponds to the size of the rectangular-shaped first release coating 14 on the backside 12 of the first piece 10 of material.

Figure 3:
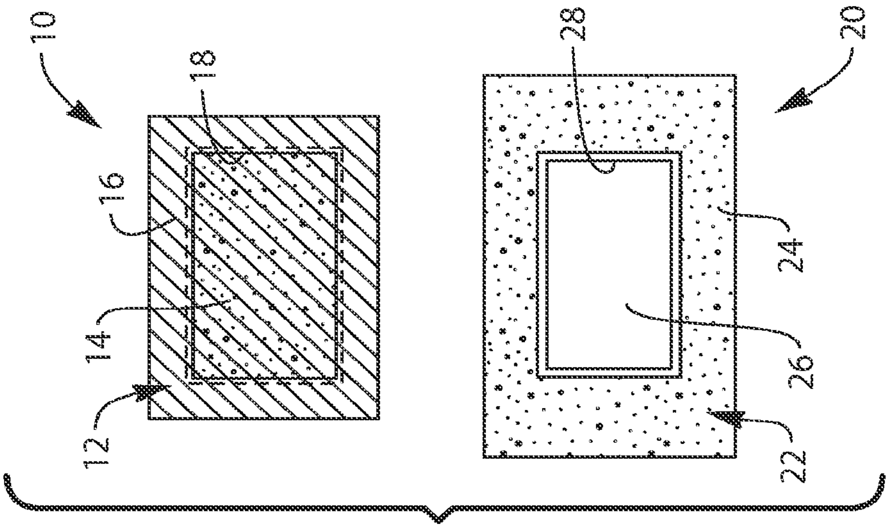
FIG. 3 is similar to FIGS. 1 and 2, and shows a perforation in the first thermal paper portion of FIGS. 1 and 2, and a die cut in the second thermal paper portion of FIGS. 1 and 2.

As shown in FIG. 3, a substantially rectangular-shaped perforation 18 is formed in the first piece 10 of material. The size of the rectangular-shaped perforation 18 corresponds to about the same size as the rectangular-shaped first release coating 14. A substantially rectangular-shaped die cut 28 is formed in the second piece 20 of material. The rectangular-shaped die cut 28 corresponds to about the same size as the central rectangular area 26 which is devoid of second release coating 24. The rectangular-shaped perforation 18 may be slightly larger than the rectangular-shaped die cut 28.

Figure 4:
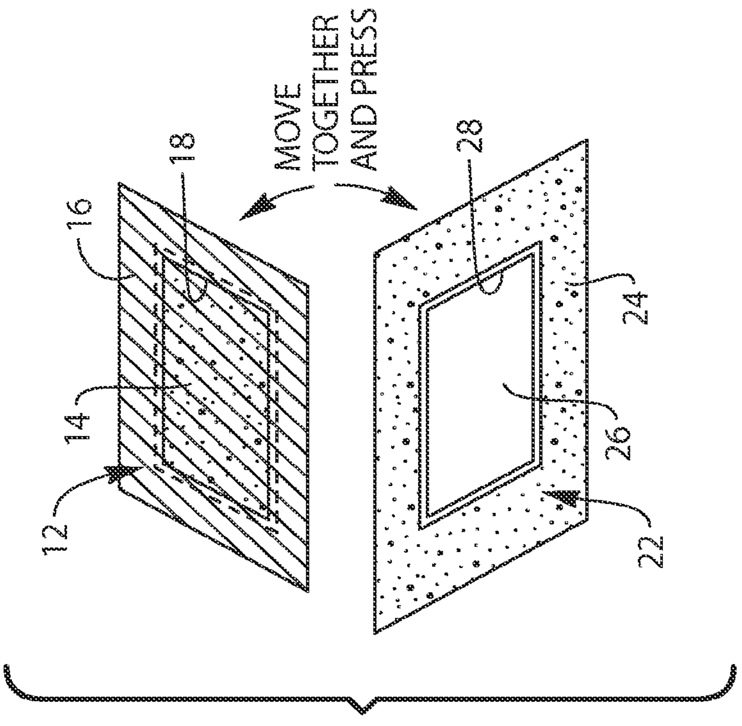
FIG. 4 is a perspective view showing the first and second thermal paper portions of FIG. 3 being assembled together to form a blank linerless combined mailing label and return label.
Figure 5:
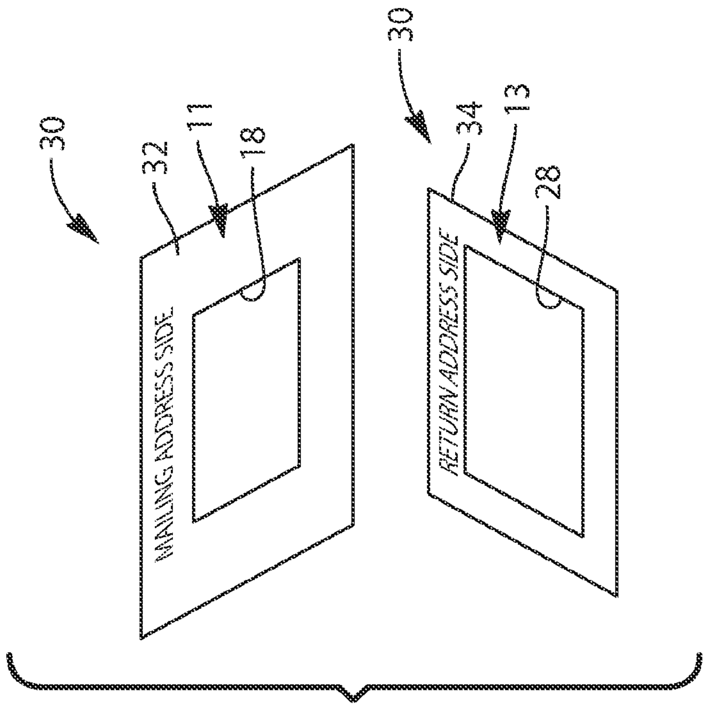
FIG. 5 is a perspective view showing mailing address side of the blank linerless combined mailing label and return label of FIG. 4, and return address side of the blank linerless combined mailing label and return label of FIG. 4.

Referring to FIG. 4, the backside 12 of the first piece 10 of material and the back side 22 of the second piece 20 of material are moved towards each other and pressed together to form a blank combined mailing label and return label. When the backside 12 and the back side 22 of the first and second pieces 10, 20 of material engage, a frame-shaped glue portion of the pressure-sensitive glue 16 engages with and adheres to the frame-shaped second release coating 24. Also, a rectangular-shaped glue portion of the pressure-sensitive glue 16 on the backside 12 of the first piece 10 adheres to the central rectangular area 26 of the back side 22 of the second piece 20 devoid of second release coating 24. The blank combined mailing label and return label formed is shown in FIG. 5, and is designated with reference numeral "30". Mailing address side 32 of the combined label 30 is shown at top of FIG. 5, and return address side 34 of the combined label is shown at bottom of FIG. 5. The combined mailing label and return label 30 is now ready to be used.

Figure 6:
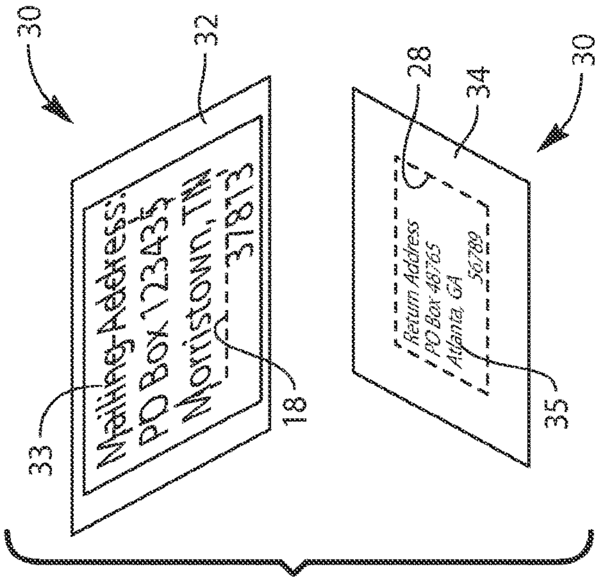
FIG. 6 is similar to FIG. 5, and shows a mailing address printed on the mailing address side, and a return address printed on the return address side of the linerless combined mailing label and return label of FIG. 5.
Figure 7:
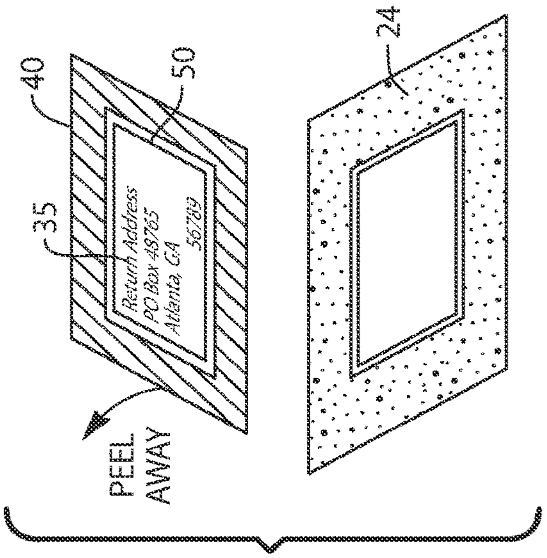
FIG. 7 is a perspective view showing mailing label being removed and ready to be applied to a mailing package to be mailed to the mailing address of FIG. 6.

During use of the combined mailing label and return label 30, a mailing address 33 is printed on the mailing address side 32, and a return address 35 is printed on the return address side 34, as shown in FIG. 6. Then, as shown in FIG. 7, mailing label 40 is peeled away and can be applied to a mailing package to be sent to the recipient indicated in the mailing address 33 (FIG. 6) printed on the mailing address side 32. While mailing label 40 is being peeled away, return label 50 is also peeled away and is attached to the back of mailing label 40 as shown in FIG. 7. This occurs because of the rectangular-shaped glue portion of the pressure-sensitive glue 16 (which overlies the rectangular-shaped first release coating 14 shown in FIG. 3) adhering to the rectangular area 26 and the presence of the die cut 18 formed in the second piece 20 of material. Thus, return label 50 breaks away at its die ties as mailing label 40 is being peeled away as shown in FIG. 7, and is attached to the back of mailing label 40 by way of the rectangular-shaped glue portion. Dimensions of the die cut 18 defines dimensions of return label 50.

Figure 8:
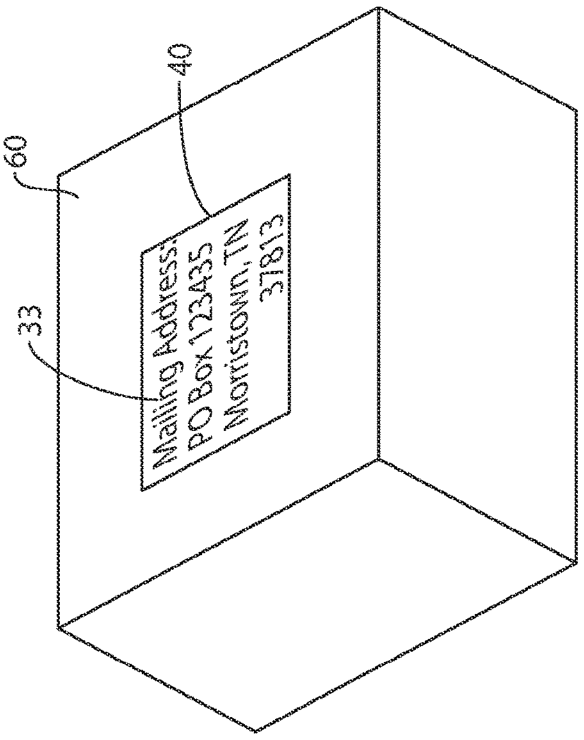
FIG. 8 is a perspective view showing the removed mailing label of FIG. 7 applied to a mailing package to be mailed to the mailing address of FIG. 6.
Figure 10:
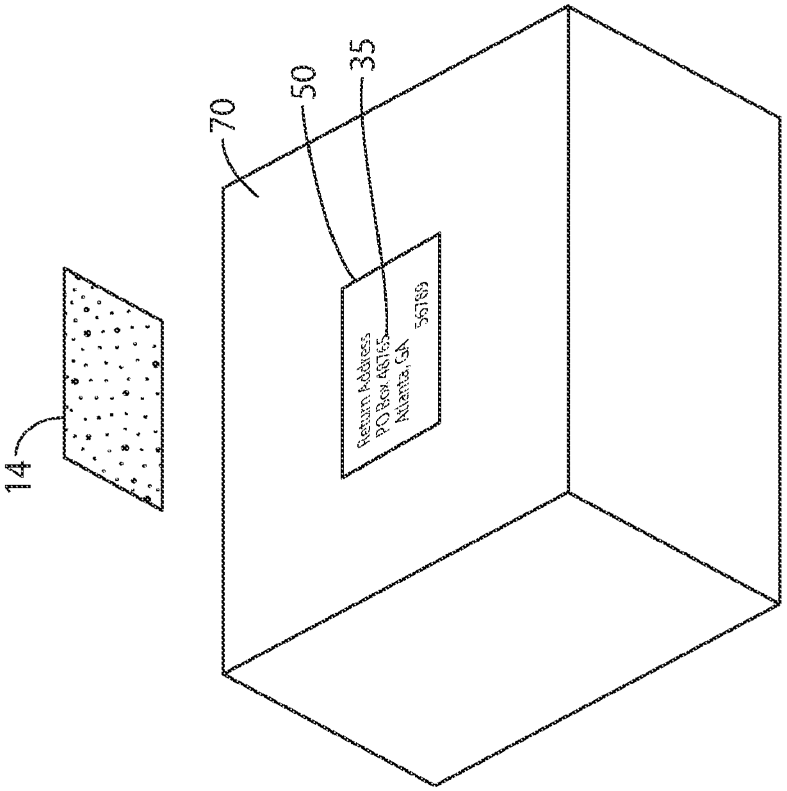
FIG. 10 is a perspective view showing the removed return label of FIG. 9 peeled away and applied to a return package to be returned to the return address of FIG. 6.
Figure 9:
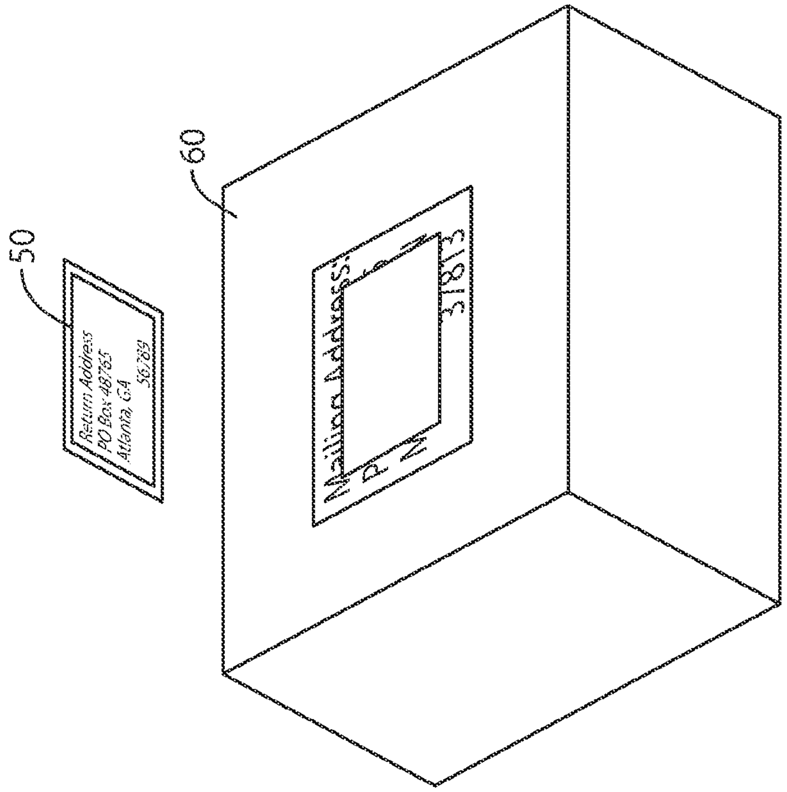
FIG. 9 is a perspective view showing return label being removed from the mailing package of FIG. 8.

As shown in FIG. 8, mailing label 40 (along with return label 50 attached on back) is applied to a mailing package 60 to be sent to the recipient indicated in the mailing address 33. After the recipient at the mailing address 33 receives the mailing package 60, the recipient can remove return label 50 from the combined label, as shown in FIG. 9. More specifically, return label 50 is removed by manipulating and breaking the perforation 18 which is formed in the first piece 10 of material (FIG. 3). The recipient at the mailing address 33 can now use the removed return label 50 to send a return package 70 (as shown in FIG. 10) to the recipient indicated in the return address 35. More specifically, return label 50 is peeled away from the first release coating 14. The corresponding glue portion which previously overlaid the first release coating 14 allows return label 50 to be applied to the return package 70.

It should be apparent that a combined mailing label and return label is provided using two pieces of one-sided thermal paper material which are joined together with a layer of pressure-sensitive adhesive therebetween. One piece of thermal paper material has a perforation and the other piece of thermal paper material has a corresponding die cut in registration with the perforation such that a mailing label (with a return label on its back) can be peeled away and applied to a mailing package. The perforation allows the recipient of the mailing package to manipulate and remove the return label from the mailing package, and thereby to expose the return address on the return address side of the return label. The removed return label can then be subsequently peeled away from a release coating material and applied to a return package.

It should also be apparent that adhesive for the mailing label and adhesive for the return label are from the same layer of adhesive which was applied to make the combined mailing label and return label. Accordingly, only one layer of adhesive is needed to manufacture the combined mailing label and return label.

It should also be apparent that the combined mailing label and return label is linerless in that there is no release liner between two pieces of thermal paper material. Since no release liner is needed, the result is less cost to manufacture the combined mailing label and return label. Also, since no release liner is needed, the combined mailing label and return label can be manufactured using simpler equipment.

Although the above description describes a rectangular-shaped mailing label 40 and a rectangular shaped return label 50 (FIG. 7), it is conceivable that other shapes are possible. Accordingly, other shapes of perforations in the first piece 10 of material (FIG. 3) and other shapes of die cuts in the second piece 20 of material are possible. Also, although the above description describes pressure-sensitive glue being applied to substantially the entire backside 12 of the first piece 10 of material, it is conceivable that only a portion or portions of the backside 12 have pressure-sensitive glue applied thereto. Any combination of shapes of perforations, shapes of die cuts, release coating patterns, and adhesive patterns may be used.

Also, although the above description describes first and second pieces of thermal paper being used to make a combined label, it is conceivable that first and second pieces of non-thermal paper may be used to make a combined label.

Further, although the above description describes a combined label used in an application as a mailing label and a return label, it is conceivable that the combined label may used in other types applications such as any type of application where a primary label and a secondary label are needed.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A combination label, comprising:

a first substrate comprising a first release coating disposed on a first portion of a backside of the first substrate and an adhesive coating disposed on the backside with the adhesive coating covering the first release coating and remaining portions of the backside, wherein the remaining portions of the backside for the first substrate comprises the adhesive coating but lacks the first release coating that is deposited under the adhesive coating on the first portion of the backside for the first substrate; and a second substrate comprising a second release coating disposed on a backside of the second substrate;

wherein the first substrate and the second substrate are aligned and joined together by the adhesive coating on the corresponding backsides;

wherein a primary label is defined in the first substrate and a secondary label is defined in the second substrate and the primary label and the secondary label are adapted to be separated from the first substrate and second substrate as two independent labels connected together;

wherein the primary label and the secondary label are further adapted to be peeled apart with adhesive from the adhesive layer remaining on the backside of the secondary label to permit the secondary label to be affixed to a surface.

2. The combination label of claim 1, wherein the first release coating and the second release coating are a same type of release coating.

3. The combination label of claim 1, wherein the first release coating and the second release coating are different types of release coatings.

4. The combination label of claim 1, wherein the first substrate is larger than the second substrate.

5. The combination label of claim 1, wherein the first portion of the backside corresponds to the primary label defined in the first substrate.

6. The combination label of claim 5, wherein the second substrate is substantially a same size as the first portion of the backside that corresponds to the primary label.

7. The combination label of claim 1, wherein the primary label is defined by a first rectangular die cut into the first substrate.

8. The combination label of claim 7, wherein the secondary label is defined by a second rectangular die cut into the second substrate.

9. The combination label of claim 8, wherein the first rectangular die cut is larger than the second rectangular die cut.

10. The combination label of claim 1, wherein the first substrate is a first thermal paper, and the second substrate is a second thermal paper.

11. The combination label of claim 1, wherein the primary label is a mailing address label, and the secondary label is a return address label.

12. A combination label, comprising:

a first thermal paper comprising a die cut portion defining a primary label;

a second thermal paper comprising a die cut portion defining a secondary label, wherein the second thermal paper is substantially a same size and shape as an area defined by the die cut portion of the first thermal paper;

a backside of the first thermal paper that corresponds to the area defined by the die cut portion of the first thermal paper comprises a release coating;

the backside of the first thermal paper comprises an adhesive coating with the adhesive coating covering the area defined by the die cut portion of the first thermal paper; and a backside of the second thermal paper that corresponds to an area defined by the die cut portion of the second thermal paper comprises the release coating;

wherein the primary label is adapted to be removed from the first thermal paper with the secondary label attached to the backside of the first thermal paper;

wherein secondary label is adapted to be peeled away from the primary label with the adhesive coating remaining on the backside of the secondary label to reapply the backside of the secondary label to a surface.

13. The combination label of claim 12, wherein the first area defined by the die cut of the first thermal paper is greater than the area defined by the die cut of the second thermal paper.

14. The combination label of claim 12, wherein a front side of the primary label comprises a printed mailing address and a front side of the secondary label comprises a printed return address.

* * * * *